US008903727B2

(12) United States Patent
Comerford et al.

(10) Patent No.: US 8,903,727 B2
(45) Date of Patent: *Dec. 2, 2014

(54) MACHINE, SYSTEM AND METHOD FOR USER-GUIDED TEACHING AND MODIFYING OF VOICE COMMANDS AND ACTIONS EXECUTED BY A CONVERSATIONAL LEARNING SYSTEM

(71) Applicant: Nuance Communications, Inc., Burlington, MA (US)

(72) Inventors: Liam David Comerford, Carmel, NY (US); Mahesh Viswanathan, Yorktown Heights, NY (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/786,650

(22) Filed: Mar. 6, 2013

(65) Prior Publication Data

US 2013/0179174 A1 Jul. 11, 2013

Related U.S. Application Data

(63) Continuation of application No. 12/357,342, filed on Jan. 21, 2009, now Pat. No. 8,407,057.

(51) Int. Cl.
*G10L 25/00* (2013.01)
*G10L 15/06* (2013.01)
*G10L 15/22* (2006.01)

(52) U.S. Cl.
CPC ............... *G10L 15/06* (2013.01); *G10L 15/22* (2013.01); *G10L 2015/0631* (2013.01)

USPC .......... 704/275; 704/246; 704/247; 704/251; 704/252

(58) Field of Classification Search
USPC .......................... 704/246, 247, 251, 252, 275
See application file for complete search history.

(56) References Cited

U.S. PATENT DOCUMENTS

| 6,889,191 | B2 | 5/2005 | Rodriguez et al. |
| 6,961,644 | B2 | 11/2005 | Mercier et al. |
| 7,257,415 | B2 | 8/2007 | Shostak |

(Continued)

OTHER PUBLICATIONS

Cavedon et al., "Developing a Conversational In-Car Dialog System", 11 pages, 2007, USA.

(Continued)

*Primary Examiner* — Leonard Saint Cyr
(74) *Attorney, Agent, or Firm* — Wolf, Greenfield & Sacks, P.C.

(57) ABSTRACT

A machine, system and method for user-guided teaching and modifications of voice commands and actions to be executed by a conversational learning system. The machine includes a system bus for communicating data and control signals received from the conversational learning system to a computer system, a vehicle data and control bus for connecting devices and sensors in the machine, a bridge module for connecting the vehicle data and control bus to the system bus, machine subsystems coupled to the vehicle data and control bus having a respective user interface for receiving a voice command or input signal from a user, a memory coupled to the system bus for storing action command sequences learned for a new voice command and a processing unit coupled to the system bus for automatically executing the action command sequences learned when the new voice command is spoken.

18 Claims, 7 Drawing Sheets

(56) References Cited

U.S. PATENT DOCUMENTS

| | | |
|---|---|---|
| 7,317,789 B2 | 1/2008 | Comerford |
| 7,321,854 B2 | 1/2008 | Sharma et al. |
| 2004/0117084 A1* | 6/2004 | Mercier et al. ............ 701/36 |
| 2005/0144009 A1 | 6/2005 | Rodriguez et al. |
| 2005/0147219 A1* | 7/2005 | Comerford ........... 379/88.18 |
| 2007/0248218 A1 | 10/2007 | Comerford |
| 2007/0294122 A1 | 12/2007 | Johnston |
| 2008/0091434 A1 | 4/2008 | Rodriguez et al. |
| 2010/0184011 A1 | 7/2010 | Comerford et al. |

OTHER PUBLICATIONS http://www.mercuryvehicles.com/extras/sync.asp, 2008.
http://www.nuance.com/news/pressreleases/2006/20060330_automotive.asp, 2006.

* cited by examiner

SAMPLE TEACHING DIALOG:

HUMAN OPERATOR = "D"
CONVERSATIONAL SOFTWARE CONTAINING THE LEARNING SYSTEM = "C"

```
D: "COMPUTER, LEARN A NEW COMMAND." ~ 302
C: "OK, WHAT DO YOU WANT TO CALL THE NEW COMMAND?" ~ 304
D: "I WANT QUIET" ~ 304
C: "WHAT DO YOU WANT ME TO DO?" ~ 306
D: "RADIO OFF" ~ 306
D: "CD OFF" ~ 306
D: "CLOSE THE WINDOWS" ~ 306
D: "CLIMATE CONTROL TO SEVENTY TWO DEGREES" ~ 306
D: "MUTE THE TELEPHONE" ~ 306
D: "I'M DONE" ~ 308
```
— 510

FIG. 5

SAMPLE EXECUTION DIALOG:

HUMAN OPERATOR = "D"
CONVERSATIONAL SOFTWARE CONTAINING THE LEARNING SYSTEM = "C"

```
D: "I WANT QUIET" ~ 402
C: "OK" ~ 404
C: <COMMAND: RADIO, OFF> ~ 404
C: <COMMAND: CD, OFF> ~ 404
C: <COMMAND: WINDOW, FRONT LEFT, CLOSE> ~ 404
C: <COMMAND: WINDOW, FRONT RIGHT, CLOSE> ~ 404
C: <COMMAND: WINDOW, REAR LEFT, CLOSE> ~ 404
C: <COMMAND: WINDOW, REAR RIGHT, CLOSE> ~ 404
C: <COMMAND: CLIMATE CONTROL, SET TEMPERATURE, 72> ~ 404
C: <COMMAND: TELEPHONE, MUTE> ~ 404
C: "ALL DONE" ~ 406
```
— 610

FIG. 6

EXAMPLE OF USING A HAPTIC MODALITY TO TRAIN THE CONVERSATIONAL SYSTEM:

```
USER: "LEARN A NEW COMMAND."  ~902
CAR:  "WHAT DO YOU WANT TO CALL THE NEW COMMAND?"  ~904
USER: "I WANT QUIET"  ~906
CAR:  "WHAT DO YOU WANT ME TO DO?"  ~908
USER: <TURNS OFF RADIO>  ~910
USER: <CLOSES WINDOW>  ~912
USER: "SET CLIMATE CONTROL TO SEVENTY TWO DEGREES  ~914
USER: <REDUCES FAN SPEED TO 1>  ~916
USER: "MUTE THE TELEPHONE"  ~918
USER: "I'M DONE"  ~920
```

FIG. 9

EXAMPLE OF USING A TOUCH - SCREEN DEVICE TO TRAIN THE CONVERSATIONAL SYSTEM:

```
USER: "LEARN SOMETHING NEW."  ~1002
SYSTEM: "WHAT'S IT CALLED?"  ~1004
USER: "I WANT TO GO TO IBM WATSON"  ~1006
SYSTEM: "SHOW ME WHAT ME TO DO."  ~1008
USER: "NAVIGATION"  ~1010
NAVIGATION: "READY"  ~1012
USER: USES ON-SCREEN MENU TO GO TO <ADDRESS>,
      <PREVIOUSLY STORED ADDRESSES>, THEN SELECTS
      ADDRESS CORRESPONDING TO PREFERRED IBM SITE  ~1014
USER: PRESSES ENTER FOR SYSTEM TO ACCEPT ADDRESS  ~1016
NAVIGATION: <PLAYS BACK FULL ADDRESS FOR CONFIRMATION>  ~1018
USER: "TEACHING COMPLETE."  ~1020
```

FIG. 10

MACHINE, SYSTEM AND METHOD FOR USER-GUIDED TEACHING AND MODIFYING OF VOICE COMMANDS AND ACTIONS EXECUTED BY A CONVERSATIONAL LEARNING SYSTEM

CROSS REFERENCE TO RELATED APPLICATIONS

This application is a continuation of U.S. application Ser. No. 12/357,342, filed Jan. 21, 2009 entitled: "MACHINE, SYSTEM AND METHOD FOR USER-GUIDED TEACHING AND MODIFYING OF VOICE COMMANDS AND ACTIONS EXECUTED BY A CONVERSATIONAL LEARNING SYSTEM", which is hereby incorporated by reference to the maximum extent allowable by law.

FIELD OF THE INVENTION

The present invention relates to machines and more specifically to a user-guided technique for modifying a command vocabulary set in a conversational learning system coupled to a computer system in a vehicle or machine in order to perform user-guided teaching and/or learning of new commands and actions to be executed by the conversational learning system.

BACKGROUND

Spoken language user interface systems are largely built to support user task completion, where the task is one that has been anticipated by the system designer. In addition, the tasks that are addressed by the spoken language user interface system are largely addressed in a vocabulary chosen by the application designer. Both the task set and the vocabulary choices may not be a good fit to any given user. As such, there is a need to provide a spoken language user interface that can be tailored for a specific user.

SUMMARY

The present invention resides in a machine, system and method for user-guided modification of a command vocabulary set of a conversational or spoken language control system installed in a vehicle or machine coupled to a computer system, in accordance with an embodiment of the invention. The machine includes a system bus for communicating data and control signals received from the conversational learning system to a computer system in the machine, a vehicle data and control bus for connecting devices and sensors in the machine, a bridge module for connecting the vehicle data and control bus to the system bus, one or more respective machine subsystems coupled to the vehicle data and control bus of the computer system, the one or more respective machine subsystems having a respective user interface for receiving a voice command or input signal from a user for modifying a voice command set in the conversational learning system of the machine, a memory coupled to the system bus for storing one or more action command sequences learned for a new voice command, wherein the one or more action command sequences comprises at least one of: one or more voice commands, one or more actions performed on one or more physical interfaces of the one or more respective machine subsystems coupled to the vehicle data and control bus and a combination of the one or more voice commands and the one or more actions performed and a central processing unit coupled to the system bus for executing the one or more action command sequences learned when the new voice command is spoken.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 5 depicts an embodiment of a teaching or learning dialog between a human operator or user and a conversational learning system in a vehicle or machine that contains a command modification tool or program for modifying a command vocabulary set for user-guided teaching and/or learning of a new voice command and/or action, in accordance with an embodiment of the present invention.

FIG. 6 depicts an embodiment of an execution dialog between a human operator or user and a conversational learning system in a machine or vehicle containing an execution tool or program for performing or executing a sequence of actions or commands learned for a new voice command and/or action, in accordance with an embodiment of the present invention.

FIG. 9 depicts an embodiment of a teaching or learning dialog between a human operator or user and a conversational learning system in a vehicle or machine that contains a command modification tool or program for modifying a command vocabulary set using a haptic modality for user-guided teaching and/or learning of a new voice command and/or action, in accordance with an embodiment of the present invention.

FIG. 10 depicts an embodiment of a teaching or learning dialog between a human operator or user and a conversational learning system in a vehicle or machine that contains a command modification tool or program for modifying a command vocabulary set using a touch screen device for user-guided teaching and/or learning of a new voice command and/or action, in accordance with an embodiment of the present invention.

DETAILED DESCRIPTION

Figure 1:
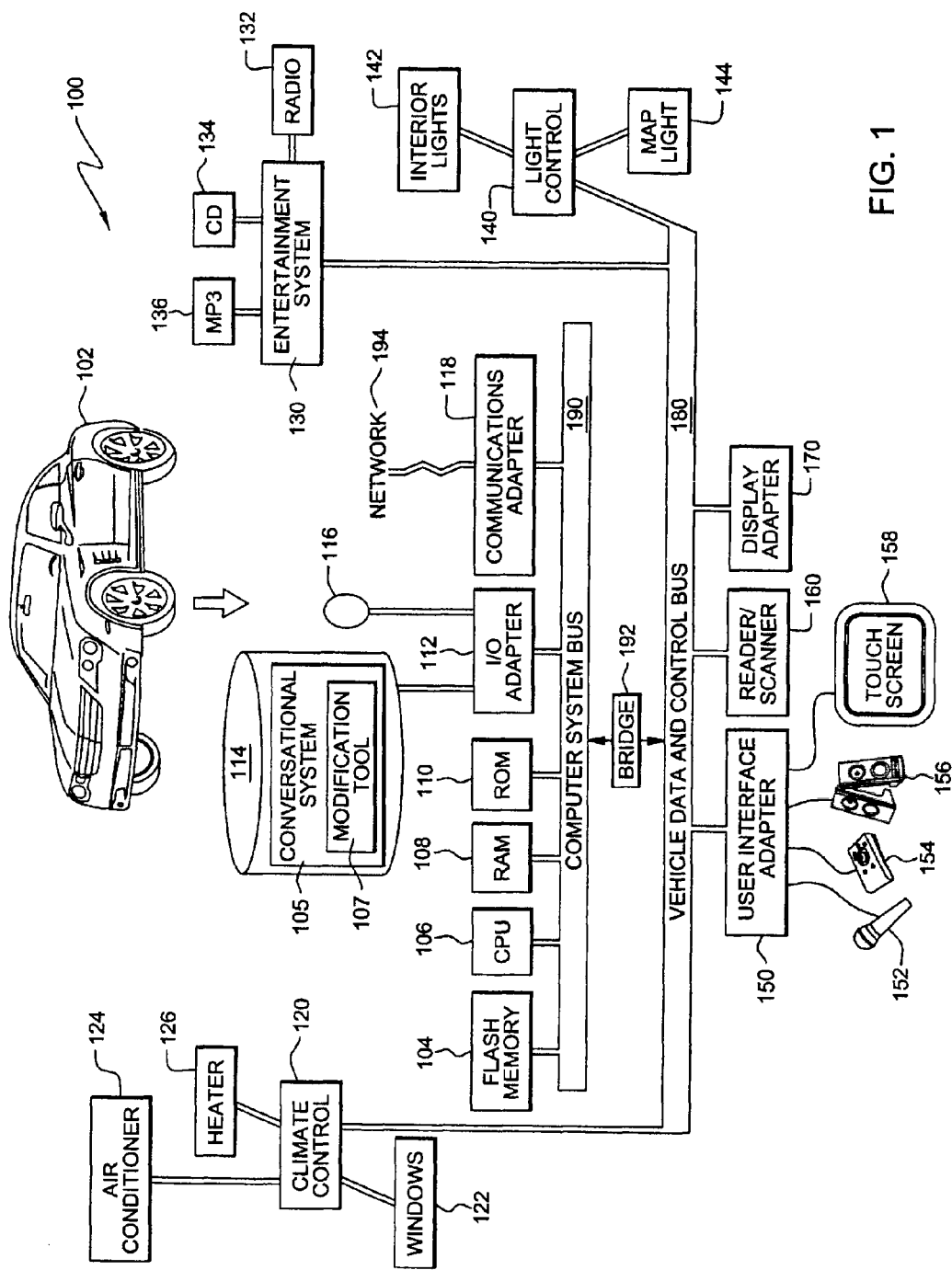
FIG. 1 is a schematic block diagram illustrating one embodiment of a machine, in particular, a vehicle coupled to a computer system containing a conversational learning system that includes a command modification tool or program for modifying a command vocabulary set for user-guided teaching and/or learning of new voice commands and/or actions to be executed by the conversational learning system, in accordance with an embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the invention provides a vehicle or machine having installed thereon a computing system that includes a conversational learning system having a command modification tool or program for modifying a command vocabulary set for user-guided teaching and/or learning of new voice commands and/or actions, in accordance with an embodiment of the present invention. Reference is now made to FIG. 1, reference numeral 100, which schematically illustrates an embodiment of a machine, namely, a vehicle 102 having a computing system that includes a conversational learning system 105 (also referred to as a "conversational system" or "spoken system" or a "learning system" or a "speech recognition system") having a command modification tool or program 107 for user-guided teaching or learning of voice commands and actions for expanding or modifying a set of voice commands, in accordance with an embodiment of the present invention.

In an embodiment, the vehicle or car is a land vehicle having wheels. Although the invention is described with respect to a conversational learning system having a command modification tool or program that is installed in a vehicle 102 for performing user-guided teaching or learning of voice commands and actions based on a user's preferences, it will be understood by one skilled in the art that the teachings of the conversational learning system can be applied to a conversational learning system installed in any machine or apparatus in a home or an office in order to modify voice commands and/or actions for controlling a speech enabled environment.

In one embodiment, the conversational learning system 105 is a spoken language control system that uses a commercially available speech recognition program or software, such as, the IBM® Embedded Speech Recognition software that is commercially available from International Business Machines Corporation. In an embodiment, the conversational learning system 105 includes a command modification tool or program 107 for modifying pre-determined voice commands and actions in the conversational learning system. The conversational system 105, which includes the command modification tool 107, comprises a logic unit that contains a plurality of modules configured to functionally execute the necessary steps of modifying a pre-determined voice command set and actions in the conversational system 105, as discussed further herein below with respect to FIG. 2.

Further, as shown in FIG. 1, the vehicle computing system 100 having the conversational system 105 includes a vehicle data and control bus 180. In an embodiment, the vehicle data and control bus comprises a Controller Area Network (CAN) bus. However, the vehicle data and control bus may alternatively comprise any of the following: MOST (Media Oriented Systems Transport), SAE J1850 interface, MI (Motorola Interconnect) bus, DSI (Distributed Systems Interface) bus, BST (Bosch-Siemens-Temic) bus and Boeing Intellibus. In an embodiment, the vehicle data and control bus 180 is configured to interface with one or more devices or components within the vehicle 102, such as, the climate control system 120, the entertainment system 130 and/or the light control system 140 within the vehicle 102. Further, the vehicle data and control bus 180 is coupled to a user interface adapter 150, a reader or scanner device 160 and a display adapter 170, as explained further herein below. In particular, a user may operate or control the various devices or components within the vehicle 102 by interfacing with one or more devices coupled to the user interface adapter 150 coupled to the vehicle data and control bus 180.

Further, in an embodiment as shown in FIG. 1, the computing system 100 includes a computer system bus 190 that is coupled to the various components of the computing system 100 in the vehicle 102 and is further coupled to the vehicle data and control bus 180 via an intermediate bridge module 192, which in an embodiment supports two way communication with buffering, signal level and code translation support. In an embodiment, the system bus 190 connects a central processing unit (CPU) 106, a flash memory 104, a main memory comprised of RAM (Random Access Memory) 108, ROM (Read-Only Memory) 110, an input/output (I/O) adapter 112 and a communications adapter 118, which can interconnect computer bus 190 with an external network 194 through a suitable connection. The communications adapter 118 is configured, in one embodiment, to facilitate network communications of the system 100 over a communications channel of a network 194 that the conversational system is connected to, such that, the system 100 can communicate with other systems. Further, in an embodiment, the input/output (I/O) adapter 112 communicates with devices, such as, the hard disk 114 and/or a computer readable storage medium or media 116, such as, a magnetic tape or disk, optical media, DVD, memory stick, semiconductor memory, etc., which contains machine readable instructions that can be loaded into the hard disk 114 containing the conversational system 105 with a command modification tool 107 for performing user-guided modification of a pre-determined voice command or vocabulary set and actions in the conversational system 105. Further, in an embodiment, the vehicle computer system 100 can download machine readable instructions stored on a server coupled to the vehicle computer system 100 via the network 194. Furthermore, the communications adapter 118 is configured to permit communication between the various components or modules of the vehicle conversational system 100.

Turning to the vehicle data and control bus 180, in an embodiment, the vehicle data and control bus 180 within system 100 is coupled to the climate control system 120, the entertainment system 130, the light control system 140, the user interface adapter 150, a reader or scanner 160 and a display adapter 170. In an embodiment, the user interface adapter 150 is coupled to one or more devices, such as, a microphone 152, a joystick 154, an audio amplifier 156 and a touch screen 158. The user interface 150, in one embodiment, is configured to enable a user or car operator to interact with the computer system 100 for inputting commands and/or data, for instance, using the touch screen 158 or the microphone 152, for modifying a voice command set or actions in order to automate performance of the learned voice commands and actions by the conversational system. In an embodiment, the climate control system 120 that is coupled to the vehicle data and control bus 180 controls devices, such as, the air conditioner 124, the heater 126, and the windows 122. Further, in an embodiment, the entertainment system 130 that is coupled to the car bus 180 controls audio devices, such as, the MP3 (Moving Picture Experts Group (MPEG) Audio Layer 3) player 136, the CD (Compact Disc) player 134 and the radio 132. In addition, the light control system 140 that is coupled to the vehicle data and control bus 180 controls devices, such as, the interior lights 142 and the map light 144. In particular, a user may use devices, such as, the speakerphone 152 or the touch screen 158 in conjunction with the conversational system 105 having the command modification tool 107 for modifying a pre-determined voice command or vocabulary set. For instance, a user may teach the conversational system 105 a new voice command by speaking the actions to be performed and/or using the touch screen 158 or a display monitor coupled to the display adapter 170 to demonstrate the actions that the conversational system 105 is to learn for a given voice command.

Figure 2:
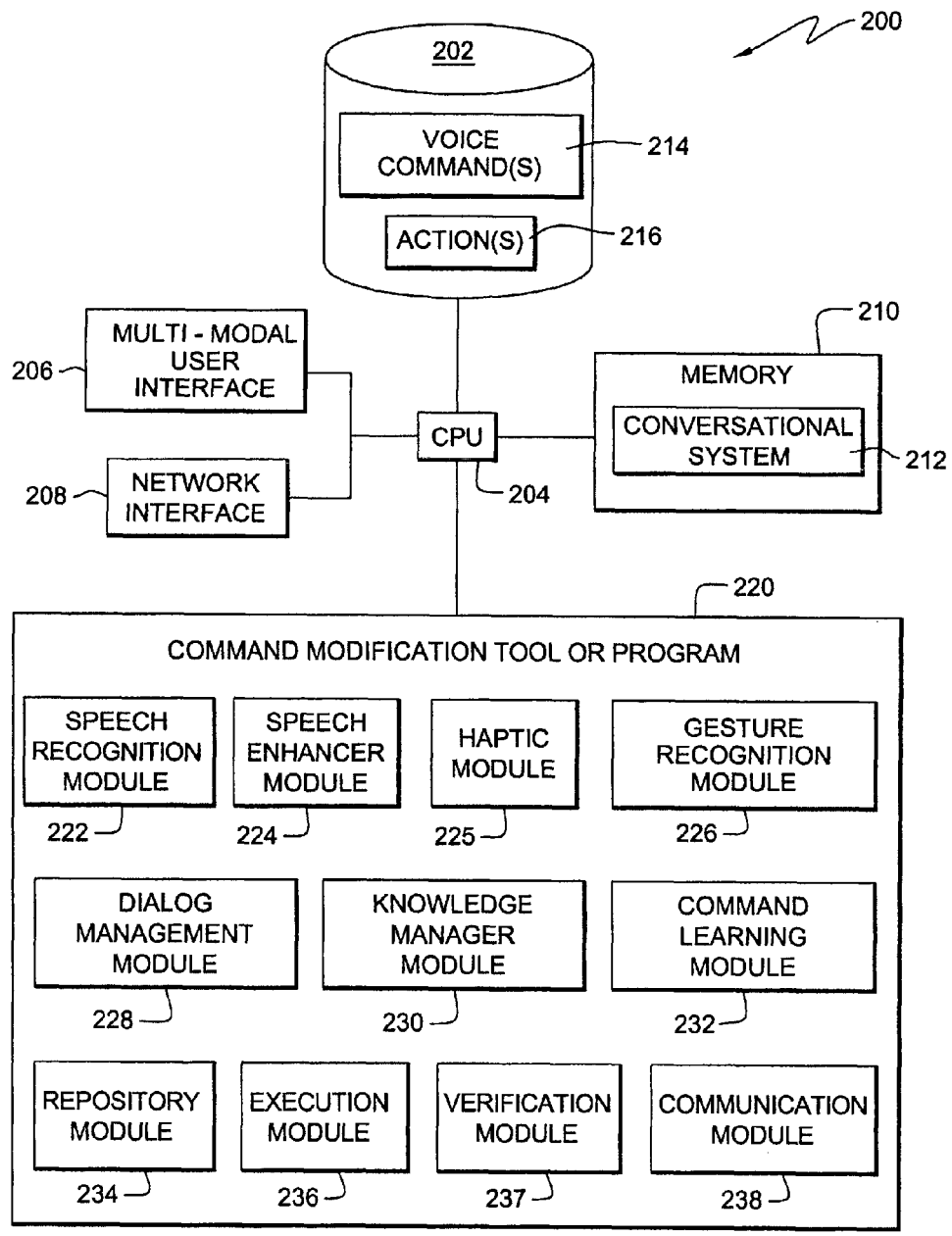
FIG. 2 depicts an embodiment of a computer system deployed in a vehicle or machine that includes a conversational learning system having a command modification tool or program for modifying voice commands and/or actions for controlling one or more devices or components within the vehicle or machine, in accordance with an embodiment of the present invention.

Reference is now made to FIG. 2, reference numeral 200, which depicts an embodiment of a computer system installed in a vehicle or a machine that includes a computer program product, namely, a conversational system 212 having a command modification tool or program 220 for modifying a pre-determined command vocabulary set and for automatically performing one or more tasks upon the utterance of a voice command, in accordance with an embodiment of the present invention. In an embodiment, the conversational system 212 is installed within a local memory 210 of the computer system 200, for instance, a computer system used in a speech enabled car or in home automation. Preferably, the computer system 200 includes a central processing unit (CPU) 204, a local storage device 202, a multi-modal user interface 206, a network interface 208, and a memory 210. The CPU 204 is configured generally to execute operations within the computer system 200. The multi-modal user interface 206, in one embodiment, is configured to enable a user or operator to interact with the computer system 200, including allowing input of voice commands (via a device connected to the user interface adapter 150 of the vehicle data and control bus 180, shown in FIG. 1) and/or indicated data inputted (for instance, via a touch screen 158 or joystick 154 coupled to the user interface adapter 150, shown in FIG. 1) for modifying a voice command set and actions to be performed by the conversational system using the command modification tool or program 220 installed on the computer system 200. The network interface 208 is configured, in one embodiment, to facilitate network communications of the computer system 200 over a communications channel of a network, such as the network 194, shown in FIG. 1. In an embodiment, the memory 210 is configured to store one or more applications or programs, such as, the conversational system 212.

In one embodiment, as shown in FIG. 2, the command modification tool or program 220 which runs on the computer system 200 comprises a logic unit that contains a plurality of modules configured to functionally execute the necessary steps of modifying a pre-determined voice command set and action set of the conversational system 212, as explained further herein below. In an embodiment, shown in FIG. 2, the command modification tool or program 220 running on the vehicle or machine computer system 200 includes a speech recognition module 222, a speech enhancer module 224, a haptic module 225, a gesture recognition module 226, a dialog management module 228, a knowledge manager module 230, a command learning module 232, a repository module 234, an execution module 236, a verification module 237 and a communication module 238. In an embodiment, the speech recognition module 222 is configured to recognize spoken language or utterances and to semantically interpret incoming user requests and utterances. In particular, the speech recognition module 222 converts speech signals into a sequence of words. The speech enhancer module 224 is configured to remove noises and acoustic signals. In an embodiment, the haptic module 225, is configured to receive haptic input via devices connected to the vehicle data and control bus in the vehicle. The gesture recognition module 226 is configured to decode indications made via a respective physical user interface of the conversational system, such as, a touch screen 158 (in FIG. 1). The dialog management module 228 is configured to semantically interpret incoming user requests and utterances and to manage interactions between the user and the conversational system in order to modify the pre-determined voice command set and/or actions of the conversational system. Further, the knowledge manager module 230 is configured to control access to knowledge systems. The command learning module 232 is configured to learn a set of commands to be performed upon the utterance of a voice command or upon receiving an indication or input made via a physical user interface. The repository module 234 is configured to store the voice commands 214 and/or actions 216 learned or modified in a local storage 202. The execution module 236 is configured to execute performance of a set of commands and/or actions learned and/or modified upon the utterance of a voice command. The verification module 237 is configured to record responses received from one or more respective systems 120, 130 and/or 140 in the vehicle 102 in order to detect any errors in future execution of the one or more action command sequences corresponding to the new voice command learned. The communication module 238 is configured to permit communication between the various modules of the command modification tool 220, memory 210, local storage 202 and with external systems, as well as communication between the vehicle data and control bus 180 and the computer system bus 190, which are connected to each other via the bridge module 192.

Figure 3:
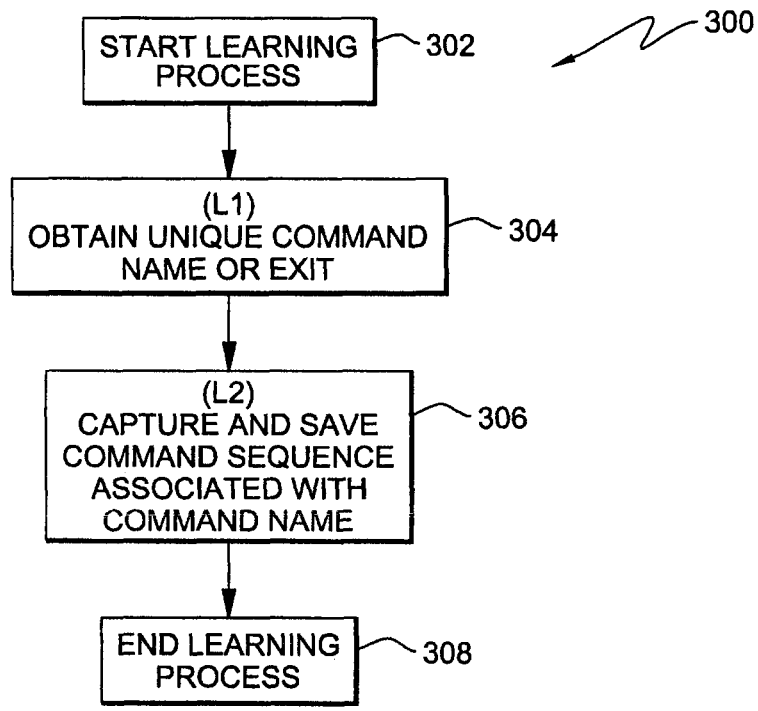
FIG. 3 depicts a flowchart outlining the overall steps performed by a conversational learning system installed in a vehicle or machine and which includes a command modification tool or program for modifying a command vocabulary set for user-guided teaching and/or learning of new voice commands and/or actions to be executed by the conversational learning system, in accordance with an embodiment of the present invention.
Figure 4:
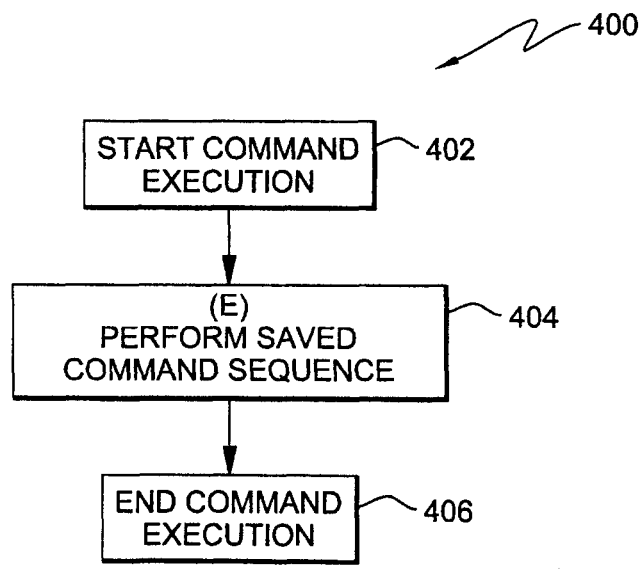
FIG. 4 depicts a flowchart outlining the overall steps performed by a conversational learning system installed in a vehicle or machine for executing a new voice command and/or actions taught to or learned by the conversational learning system, upon receipt of the new voice command from a user, in accordance with an embodiment of the present invention.

In another embodiment, the invention provides a method or process for user-guided modification of voice commands and actions performed by a conversational system having a command modification tool or program that is installed on a machine or in a vehicle, in accordance with an embodiment of the present invention. Reference is now made to FIGS. 3 and 4, which together illustrate an embodiment of a method or process for user-guided modification of voice commands and actions in a conversational system for automatically performing one or more tasks upon the utterance of a modified voice command. In particular, FIG. 3, reference numeral 300, outlines the overall learning process steps performed by a conversational system having a command modification tool installed thereon for user-guided modification or learning of a voice command set and/or actions for automating performance of one or more tasks upon the utterance of a voice command, whereas, FIG. 4, reference numeral 400, outlines the overall steps performed by a conversational system for executing a new voice command and/or actions that have been learned or modified upon receipt of the new voice command from a user, in accordance with an embodiment of the present invention.

Turning now to FIG. 3, FIG. 3 outlines the overall modification or learning process steps performed by a conversational system having a command modification tool installed thereon for user-guided modification or learning of voice commands and actions for automating performance of one or more tasks upon the utterance of a voice command. As shown in FIG. 3, in step 302, upon being prompted by a user (explained further herein below with respect to FIG. 4), the command modification tool provided in the conversational system begins or starts in step 302 the learning process for learning a new voice command or action. In an embodiment, in step 304, the conversational system obtains a unique command name for learning the new voice command and/or action(s). The steps performed by the conversational system in step 304 (designated "L1") are discussed further herein below with respect to FIGS. 6, 9 and 10. Once the conversational system has obtained a unique command name for learning the actions and/or command sequences in step 304, the conversational system begins the process of capturing and saving in step 306 the command sequences and/or actions that are to be associated with the unique command name obtained in step 304. The process of capturing and saving the command sequences and/or actions (designated "L2") that are to be associated with the unique command name, as further described herein below with respect to FIG. 7. After the conversational system has learned the command sequences and/or actions that are to be associated with the unique command name, the conversational system ends the learning process in step 308. It will be understood by one skilled in the art that the steps recited with respect to FIG. 3 are not in any particular order and that command sequences may be modified or taught to the conversational system by a user before a name is assigned to the command sequences that are learned or modified in the conversational system.

Further, referring to FIG. 4, reference numeral 400, depicts a flowchart outlining the overall steps performed by a conversational system having a command modification tool for executing a new voice command and/or actions that were previously learned by or taught to the conversational system, when the new voice command is uttered by a user, in accordance with an embodiment of the present invention. As shown in FIG. 4, in step 402, the conversational system starts execution of a command when the command name or phrase is uttered by the user. In step 404, the conversational system performs the command sequences or action sequences learned from the user during the learning process and saved by the computer system, as outlined in FIG. 3. When the conversational system has finished performing the series of command sequences or actions saved for a certain command name or phrase uttered by the user, the conversational system ends execution of the command in step 406.

Reference is now made to FIGS. 5 and 6, reference numerals 500 and 600, respectively, which depict examples or samples of the conversation or dialog that occurs between a human operator or user and a conversational system containing a command modification tool or program for performing user-guided modification of a voice command set and/or action set, in accordance with an embodiment of the present invention. In particular, FIG. 5, depicts an example of a teaching or learning dialog between a user and a conversational system containing a command modification tool or program for user-guided modification of a voice command set and/or action, in accordance with an embodiment of the present invention, whereas, FIG. 6 depicts an embodiment of an execution dialog between a human operator or user and a conversational system containing a command modification tool or program for performing or executing a sequence of actions or commands learned for a new or modified voice command and/or action, in accordance with an embodiment of the present invention.

Turning to FIG. 5, as shown in the dialog box 510 in FIG. 5, the user or human operator is designated "D" and the conversational system containing the learning or modification software or tool is designated "C". The user initiates modification or learning of a new voice command by invoking a "learning mode" by speaking a certain voice phrase or command to the conversational system. In an embodiment, the learning mode in the conversational system is invoked by the user by uttering the phrase, such as, "Learn this" or "Here's a new command" or "Computer, learn a new command". It will be understood by one skilled in the art that any suitable phrase or command can be used based on the user's preferences. In particular, as shown in dialog box 510 of FIG. 5, the user states or speaks "Computer, learn a new command.", which corresponds to step 302 shown in FIG. 3. In response, the conversational system responds, "OK, what do you want to call the new command?" (corresponding to step 304 in FIG. 3) to which the user responds "I want quiet." (corresponding to step 304 in FIG. 3). The conversational system inquires of the user "What do you want me to do?" (corresponding to step 306 in FIG. 3). On entering the learning or modification mode, the next phrase uttered by the user is added to an existing vocabulary of the system by means of an acoustic add word or by means of a large vocabulary speech recognition module. The user may then perform a series of actions, such as, uttering known commands or physically activating and/or adjusting the controls of in-car devices or appliances, which are conveyed to the conversational system by the user interfaces in the vehicle data and control bus. For example, as shown in FIG. 5, the user responds with the following commands or responses: "Radio off", "CD off", "Close the windows", "Set climate control to seventy two degrees", and "Mute the telephone" (all the commands or responses corresponding to step 306 of FIG. 3). On completion of the actions to be learned for the new phrase or command uttered, the user may utter or say a reserved phrase such as "new command complete" or "done" or "I'm done" (corresponding to step 308 in FIG. 3). The ending phrase, for instance, "I'm done" signifies to the command modification tool in the conversational system that the user has completed teaching or modifying the set of actions that are to be associated with the corresponding voice command name or phrase given to the new command learned by the conversational system.

It will be understood by one skilled in the art that the conversational system may be designed to receive different types of voice or spoken phrases (other than, "Computer, learn a new command." which signify to the conversational system that the user wishes to teach the conversational system a new voice command. Similarly, it will be understood by one skilled in the art that the conversational system may be designed to receive different types of voice phrases (other than, "I'm done") that signify to the conversational system that the user has completed teaching the set of actions corresponding to the new voice command that is being learned. Moreover, it will be understood by one skilled in the art that variations, such as, using a dialog to solicit the name of the command after the actions corresponding to the command have been demonstrated to the conversational system do not depart from the scope of the invention. In an embodiment, the physical actions performed on the device or device controls for the one or more systems in the car can be detected, sensed, measured and/or reported by the vehicle data and control bus to the conversational system in general and to the learning system in particular.

Turning to FIG. 6, reference numeral 600 depicts an example of an execution dialog between a human operator or user and a conversational system containing a command modification tool or program for performing or executing a sequence of actions or commands learned for a new voice command and/or action, in accordance with an embodiment of the present invention. As shown in the dialog box 610 in FIG. 6, the user or human operator is designated "D" and the conversational system containing the learning software is designated "C". The user initiates execution or performance of a new voice command already learned or modified by invoking an "execution mode" by speaking the certain voice phrase or command name. In an embodiment, the user initiates performance or execution of a voice command previously taught to the conversational system by uttering the learned command or phrase, for instance, "I want quiet" (corresponding to step 402 in FIG. 4), as discussed herein above with respect to FIG. 4. In response, the conversational system responds "OK" (corresponding to step 404 in FIG. 4). Further, the conversational system performs or executes the commands in the order that the user guided the conversational system: <command: radio, off>, <command: CD, off>, <command: window, front left, close>, <command: window, front right, close>, <command: window, rear left, close>, <command: window, rear right, close>, <command: climate control, set temperature, 72>, <command: telephone, mute> (all the commands or responses performed or executed corresponding to step 404 of FIG. 4). In an embodiment, the conversational system informs the user that the actions corresponding to the voice command "I want quiet" have been completed by stating "All done" (corresponding to step 406 of FIG. 4). Accordingly, as shown in FIGS. 5 and 6, the user has guided the command modification tool of the conversational system in learning that when the user issues the voice command or phrase "I want quiet", it means that the conversational system is to perform the actions of turning the radio off, turning the CD player off, closing the windows, setting the climate control to seventy two (72) degrees and muting the telephone.

Further, in an embodiment, the conversational system may ask the user to verify that the command phrase has been recorded or modified correctly. If the user determines that the voice command has not been recorded or modified correctly, the user may rerecord the voice command without losing the recorded sequence of spoken and physically executed commands. Further, in an embodiment, upon completion of the new command learning process as described herein above with respect to FIG. 5, the user may be asked to verify the actions associated with the command. If the user wishes to verify the actions associated with the command, the user states or utters the command and the conversational system will "replay" the actions evoked by the verbal commands and physical commands in the order they were given or performed by the user. On completion of verification, the new voice command becomes part of the repertoire of voice commands of the speech system. In some cases, the semantic content of command chosen by the user can be applied to minimize the possibility of errors of recognition or inclusion of superfluous and unwanted actions in a command. For example, if the user enters or utters a voice command or phrase, such as, "play a song" and then follows with physical actions or utterances that have nothing to do with the "entertainment system", a conversational error testing dialog may be entered. Similarly, if a set of actions beginning with actions that are appropriate to the semantics of the new command are followed by actions that aren't semantically appropriate, then the conversational system may suspect that the user has failed to signal "I'm done" and a fault correcting dialog may be initiated, such as, the conversational system may inquire, "Are we still working on that new command?" and the user may respond, "NO!".

Figure 7:
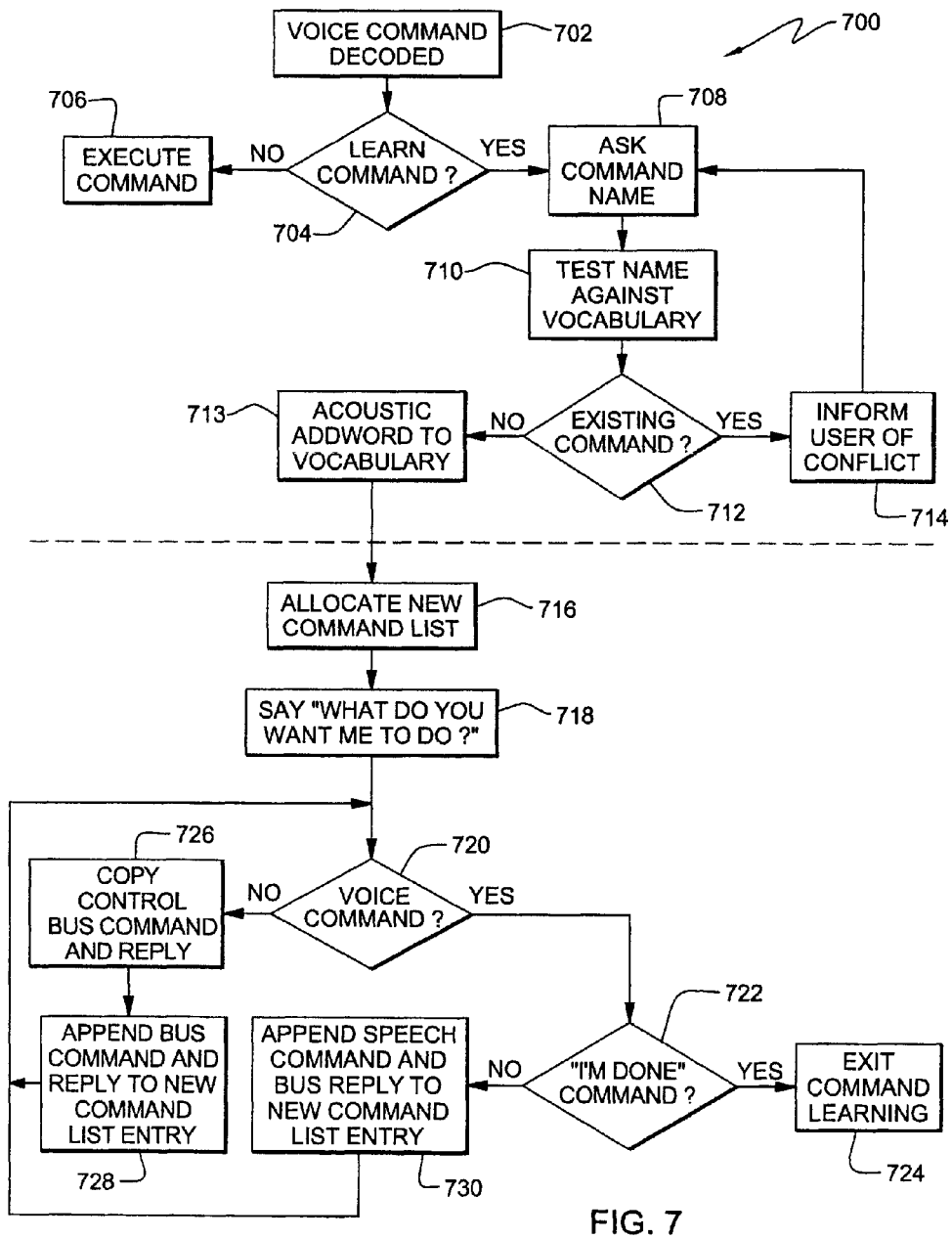
FIG. 7 depicts a flowchart outlining the detailed steps performed by a conversational learning system in a machine or vehicle for modifying a command vocabulary set in a conversational learning system for user-guided teaching and/or learning of new voice commands and/or actions to be executed by the conversational learning system, in accordance with an embodiment of the present invention.

Reference is now made to FIG. 7, reference numeral 700, which outlines the steps performed by the command modification tool in the conversational system for modifying a predetermined command or for learning a new command and associating a series of commands or action sequences with the new command, in accordance with an embodiment of the present invention. In particular, the steps 702 through 714 (shown in FIG. 7) correspond to the step 304 in FIG. 3, designated "L1". In step 702, the conversational system having a command modification tool decodes the voice command issued, that is, spoken or indicated on a touch screen by a user, as described further herein below with respect to FIGS. 9 and 10. Further, in step 704, a determination is made by the command modification tool in the conversational system as to whether or not the voice command decoded is to learn or modify a command or to execute a command already learned or modified. If the conversational system determines in step 704 that the voice command decoded is to execute a command that exists within the set of voice commands learned by the conversational system, then the conversational system executes the command in step 706, which is discussed herein below with respect to FIG. 8. However, if the conversational system determines that the voice command decoded is to learn a new command or to modify a predetermined command vocabulary set, then the conversational system asks the user, in step 708, to provide a command name or command phrase. The user provides the conversational system with a command name or command phrase, as discussed herein above with respect to FIG. 5. The conversational system tests, in step 710, the command name provided against pre-existing names contained in the command vocabulary set or list of command names and/or phrases maintained by the conversational system. The conversational system determines in step 712 whether or not the command name exists in the command vocabulary set. If the conversational system determines that the command name provided by the user is an existing command name, then the conversational system informs the user, in step 714, of the conflict and the process returns back to step 708, where the conversational system asks the user for a command name for modifying a new command. However, if the conversational system determines that the command name provided by the user is not an existing command name, then the conversational system adds the new voice command (via an Acoustic Addword command feature in the command modification tool in the conversational system) to the vocabulary and the process continues with step 716. In particular, the steps 716 through 730 (shown in FIG. 7) correspond to the steps designated "L2", which are steps performed in step 306 of FIG. 3.

As shown in FIG. 7, in step 716, the conversational system allocates the new command to the command list. In step 718, the conversational system inquires about the next step, such as, by asking or saying to the user "What do you want me to do?" Further, in step 720, the conversational system determines whether or not the command received from the user is a voice command. If the conversational system makes a determination that the command received from the user is a voice command, the conversational system further determines in step 722 whether or not the command uttered is the "I'm done" command. If the conversational system determines in step 722 that the voice command uttered is the "I'm done" command, then the conversational system exits the command learning mode in step 724, ending the learning process. Going back to step 720, if the conversational system determines that the command received from the user is not a voice command, then the conversational system copies in step 726 the control bus command and replies to the command list entry. The process continues with step 728, where the conversational system appends the bus command and bus reply to the new command list entry, and the process returns to step 720. However, if the conversational system determines in step 722 that the voice command uttered is not the "I'm done" command, then the conversational system appends the speech command and the bus reply to the new command list entry in step 730 and the process returns to step 720.

Figure 8:
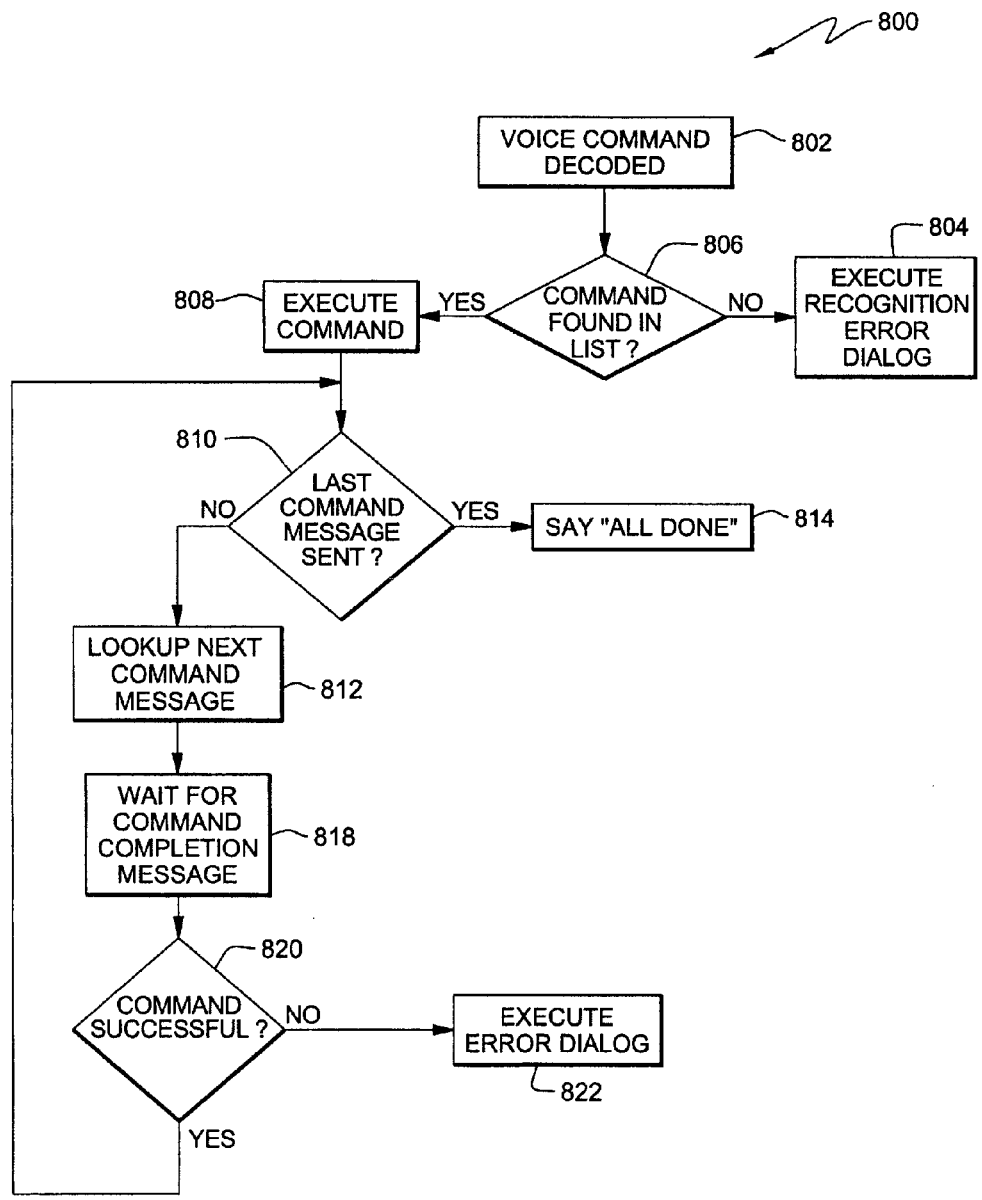
FIG. 8 depicts a flowchart outlining the detailed steps performed by a conversational learning system in a machine or vehicle for performing or executing command or action sequences associated with a modified command name upon utterance of the modified command name, in accordance with an embodiment of the present invention.

Reference is now made to FIG. 8, reference numeral 800, which depicts a flowchart outlining the detailed steps performed by a conversational system having a command modification tool for performing or executing the command or action sequences associated with a learned or modified command name or phrase upon utterance of the command name, in accordance with an embodiment of the present invention. In particular, referring back to FIG. 7, in step 704, if the conversational system determines that the voice command decoded is not a new command to be learned, then the conversational system executes the voice command decoded, as outlined in FIG. 8. In step 802, the conversational system starts execution of the command uttered by the user. The command modification tool of the conversational system determines in step 806 whether or not the command uttered is found in the list of commands maintained by the conversational system. If the conversational system determines that the voice command uttered is not found in the list, then the conversational system executes in step 804 a recognition error dialog, where the user is notified of the error, in particular, of the error of not finding or recognizing the command in the existing list of commands, ending the process of executing the voice command. However, if the voice command uttered is found in the list, then the conversational system executes the command in step 808. Further, the conversational system determines in step 810 whether or not the last command message for the voice command is sent and, if so, the conversational system says "all done" in step 814 and waits for the next user command in step 816. However, if in step 810, the conversational system determines that the last command message for the voice command is not sent, then the conversational system looks up the next command message in step 812, and waits for the command completion message in step 818. Further, the conversational system determines in step 820 whether or not execution of the command spoken by the user is successful. If the conversational system determines in step 820 that the command did not execute successfully, then the conversational system executes an error dialog in step 822. The error dialogs in steps 804 and 822 are part of conventional conversational systems and are well known to those of ordinary skill in the art. Referring back to step 820, if the conversational system determines in step 820 that the command executed successfully, then the conversational system returns to step 810 to determine if the last command message is sent.

Reference is now made to FIGS. 9 and 10, reference numerals 900 and 1000, respectively, which depict additional examples or samples of the conversation or dialog that occurs between a human operator or user and a conversational system containing a command modification tool or program for performing user-guided modification of a voice command set and/or action set, in accordance with an embodiment of the present invention. In particular, FIG. 9, depicts an example of a teaching or learning dialog between a user and a conversational system using a haptic modality to train the conversational system for modifying a voice command set and/or action, in accordance with an embodiment of the present invention, whereas, FIG. 10 depicts another example of a learning dialog between a human operator or user and a conversational system containing a command modification tool or program, using a touch screen device and a joystick device, for training the conversational system to learn a sequence of actions or commands, as desired by the user, in accordance with an embodiment of the present invention.

Turning to FIG. 9, as shown in the dialog box 930 in FIG. 9, the user or human operator is designated "User" and the conversational system containing the learning or modification software or tool is designated "System". The user initiates modification or learning of a new voice command by invoking a "learning mode" by speaking a certain voice phrase or command to the conversational system. In particular, as shown in dialog box 930 of FIG. 9, the user states or speaks "Learn a new command.", reference numeral 902, which corresponds to step 302 shown in FIG. 3. It will be understood by one skilled in the art that any suitable phrase or command can be used based on the user's preferences. In response, the conversational system responds, "What do you want to call the new command?", reference numeral 904 (corresponding to step 304 in FIG. 3) to which the user responds "I want quiet.", reference numeral 906 (corresponding to step 304 in FIG. 3). The conversational system inquires of the user "What do you want me to do?", reference numeral 908 (corresponding to step 306 in FIG. 3). The user may then perform a series of actions, such as, uttering known commands and/or physically activating and/or adjusting the controls of in-car devices or appliances, which are conveyed to the conversational system by the user interfaces in the vehicle data and control bus. For example, as shown in FIG. 9, the user responds by performing actions, such as, turning off the radio, reference numeral 910, and by closing the window, reference numeral 912. Further, the user utters or speaks "Set climate control to 72 degrees", reference numeral 914. Also, the user reduces the fan speed to 1, reference numeral 916, and utters "Mute the telephone", reference numeral 918, followed by the reserved words "I am done", reference numeral 920, to signify to the command modification tool in the conversational system that the user has completed teaching or modifying the set of actions that are to be associated with the corresponding voice command name or phrase "I want quiet" given to the new command learned by the conversational system. In an embodiment, the physical actions performed on the device or device controls for the one or more systems in the car, such as, the climate control system or the entertainment system can be detected, sensed, measured and/or reported by the vehicle data and control bus to the conversational system in general and to the learning system in particular. It will be understood by one skilled in the art that the conversational system may be designed to receive different types of haptic input in order to teach the conversational system a new voice command.

Turning to FIG. 10, reference numeral 1000, depicts an example of a dialog 1030 between the user or human operator (designated "User") and the conversational system containing the command modification software or tool (designated "System"). The user initiates modification or learning of a new voice command by invoking a "learning mode" by speaking the phrase "Learn something new", reference numeral 1002, which corresponds to step 302 shown in FIG. 3. In response, the conversational system responds, "What's it called?", reference numeral 1004 (corresponding to step 304 in FIG. 3) to which the user responds "I want to go to IBM Watson.", reference numeral 1006 (corresponding to step 304 in FIG. 3). The conversational system responds with "Show me what to do", reference numeral 1008 (corresponding to step 306 in FIG. 3). The user speaks to the navigation system coupled to the vehicle data and control bus in the car by uttering the word "Navigation" and the navigation system (designated "Navigation") responds with "Ready", reference numeral 1012. The user then performs a series of haptic actions on a touch screen device, such as, touching the address menu in a navigation system and selecting previously stored addresses and then selecting an address corresponding to a preferred IBM site, reference numeral 1014. The user further uses a joystick device to select or press the "enter" button on the touch screen device for the system to accept the address inputted, reference numeral 1016. Further, in an embodiment, the navigation system plays back the full address inputted for confirmation or verification of the new command learned, reference numeral 1018. The user ends the teaching session by uttering the words "teaching complete", reference numeral 1020. In an embodiment, the physical actions performed on the touch screen device are conveyed by the vehicle data and control bus to the conversational system in general and to the command learning system in particular. It will be understood by one skilled in the art that the conversational system may be designed to receive different types of haptic input in order to teach the conversational system a new voice command. Moreover, it will be understood by one skilled in the art that variations, such as, using a dialog to solicit the name of the command after the actions corresponding to the command have been demonstrated to the conversational system do not depart from the scope of the invention.

Accordingly, the invention provides a machine, system and method for not only modifying existing commands of the conversational system, but for teaching the conversational system to learn and execute new command and/or action sequences associated with a new command name upon utterance of the command name, in accordance with an embodiment of the present invention. The conversational system provides the ability for a user to create a spoken language user interface that is matched to the user's conception of a task and the user's choice of vocabulary. In an embodiment, a user is presented with a user interface mode, on user command, in which the user is prompted for a command and a set of one or more physical actions on the physical interfaces of devices and/or additional utterances which are already in the vocabulary of the system. The command is then associated with the user actions, so that the actions are repeated by the user interface system on receipt of the command utterance. As such, in order to utilize the conversational system, the command to learn a new command has to be in the vocabulary of the conversational system to be recognized and the action of initiating learning has to be part of its repertoire of actions. Once the command has been learned, recognizing and executing the new command are also within the domain of the conversational system given that its vocabulary and repertoire have been enlarged. Further, the invention provides the ability to combine haptic (touch) input with conversational input (as described herein above with respect to FIGS. 9 and 10) for both teaching new commands that are added to an existing command vocabulary set used by the conversational system and for modifying existing commands in an existing command vocabulary set used by the conversational system based on the user's preferences. The invention demonstrates the fluidity in switching between modalities and in combining modalities, such as, touch, speech, joystick and touch screen, among others.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for operating a machine including a conversational system and at least one device, comprising:

initiating, by the conversational system, a dialog between a user and a command modification tool in response to a request received from the user to learn a new voice command;

receiving, by the command modification tool, a new voice command during the dialog with the user;

adding, by the command modification tool, the new voice command to a vocabulary of the conversational system;

establishing, by the command modification tool, at least one new action command that corresponds to the new voice command by receiving at least one known command uttered by the user during the dialog and converting the known command to the at least one new action command, wherein the at least one known command defines an action to be taken when the new voice command is spoken by the user and wherein the at least one new action command, when executed, controls the at least one device;

appending the at least one new action command to the corresponding new voice command in the vocabulary of the conversational system; and executing the at least one new action command by automatically sending a command message to the at least one device when the new voice command is spoken by the user.

2. A method for operating a machine as defined in claim 1, wherein establishing at least one new action command further comprises receiving a user action performed by the user on the at least one device during the dialog and converting the user action to the new action command.

3. A method for operating a machine as defined in claim 2, wherein receiving a user action comprises monitoring adjustments made by the user to the at least one device.

4. A method for operating a machine as defined in claim 1, wherein establishing at least one new action command further comprises receiving a user action performed on an input device of the machine and converting the user action to the new action command.

5. A method for operating a machine as defined in claim 1, wherein the machine comprises a vehicle system and the at least one device comprises a vehicle subsystem.

6. A method for operating a machine as defined in claim 1, wherein establishing at least one new action command comprises establishing two or more new action commands that correspond to the new voice command.

7. A computer-readable storage device encoded with instructions that, when executed by a computing device, perform the method of claim 1.

8. A method for operating a machine as defined in claim 1, wherein the conversational system receives an input from the at least one device in response to a user action performed on the at least one device during the dialog with the user and provides in response thereto the at least one new action command that corresponds to the new voice command.

9. A machine comprising a processing unit, at least one device and a memory encoded with instructions of a conversational system, including instructions that, when executed by the processing unit, cause the machine to:

initiate a dialog between a user and a command modification tool in response to a request by the user to learn a new voice command;

receive a new voice command during the dialog with the user;

add the new voice command to a vocabulary of the conversational system;

establish at least one new action command that corresponds to the new voice command by receiving at least one known command uttered by the user during the dialog and converting the known command to the at least one new action command, wherein the at least one known command defines an action to be taken when the new voice command is spoken by the user and wherein the at least one new action command, when executed, controls the at least one device;

append the at least one new action command to the corresponding new voice command in the vocabulary of the conversational system; and execute the at least one new action command by automatically sending a command message to the at least one device when the new voice command is spoken by the user.

10. A machine as defined in claim 9, wherein the instructions are further configured to establish at least one new action command by receiving a user action performed by the user on the at least one device during the dialog and converting the user action to the new action command.

11. A machine as defined in claim 10, wherein receiving a user action comprises monitoring adjustments made by the user to the at least one device.

12. A machine as defined in claim 9, wherein the instructions are further configured to establish at least one new action command by receiving a user action performed on an input device of the machine and converting the user action to the new action command.

13. A machine as defined in claim 9, wherein the machine comprises a vehicle system and the at least one device comprises a vehicle subsystem.

14. A machine as defined in claim 9, wherein the instructions are configured to establish at least one new action command by establishing two or more new action commands that correspond to the new voice command.

15. A machine as defined in claim 9, wherein the conversational system receives an input from the at least one device in response to a user action performed on the at least one device during the dialog with the user and provides in response thereto the at least one new action command that corresponds to the new voice command.

16. A method for operating a vehicle system including a conversational system and at least one vehicle subsystem, comprising:

initiating, by the conversational system, a dialog between a user and a command modification tool in response to a request received from the user to learn a new voice command;

receiving, by the command modification tool, a new voice command during the dialog with the user;

adding, by the command modification tool, the new voice command to a vocabulary of the conversational system;

establishing, by the command modification tool, at least one new action command that corresponds to the new voice command, by receiving at least one known command uttered by the user during the dialog and converting the known command to the at least one new action command, wherein the at least one known command defines an action to be taken when the new voice command is spoken by the user and wherein the at least one new action command, when executed, controls the at least one vehicle subsystem;

appending the at least one new action command to the corresponding new voice command in the vocabulary of the conversational system; and executing the new action command, in response to receiving an utterance by the user of the new voice command, by automatically sending a command message to the at least one vehicle subsystem.

17. A method for operating a vehicle system as defined in claim 16, wherein establishing at least one new action command comprises establishing two or more new action commands that correspond to the new voice command.

18. A computer-readable storage device encoded with instructions that, when executed by a computing device, perform the method of claim 16.

* * * * *